Dec. 4, 1928.  1,694,153
L. S. WATRES
METHOD OF LUBRICATION AND APPARATUS THEREFOR
Filed Nov. 15, 1923
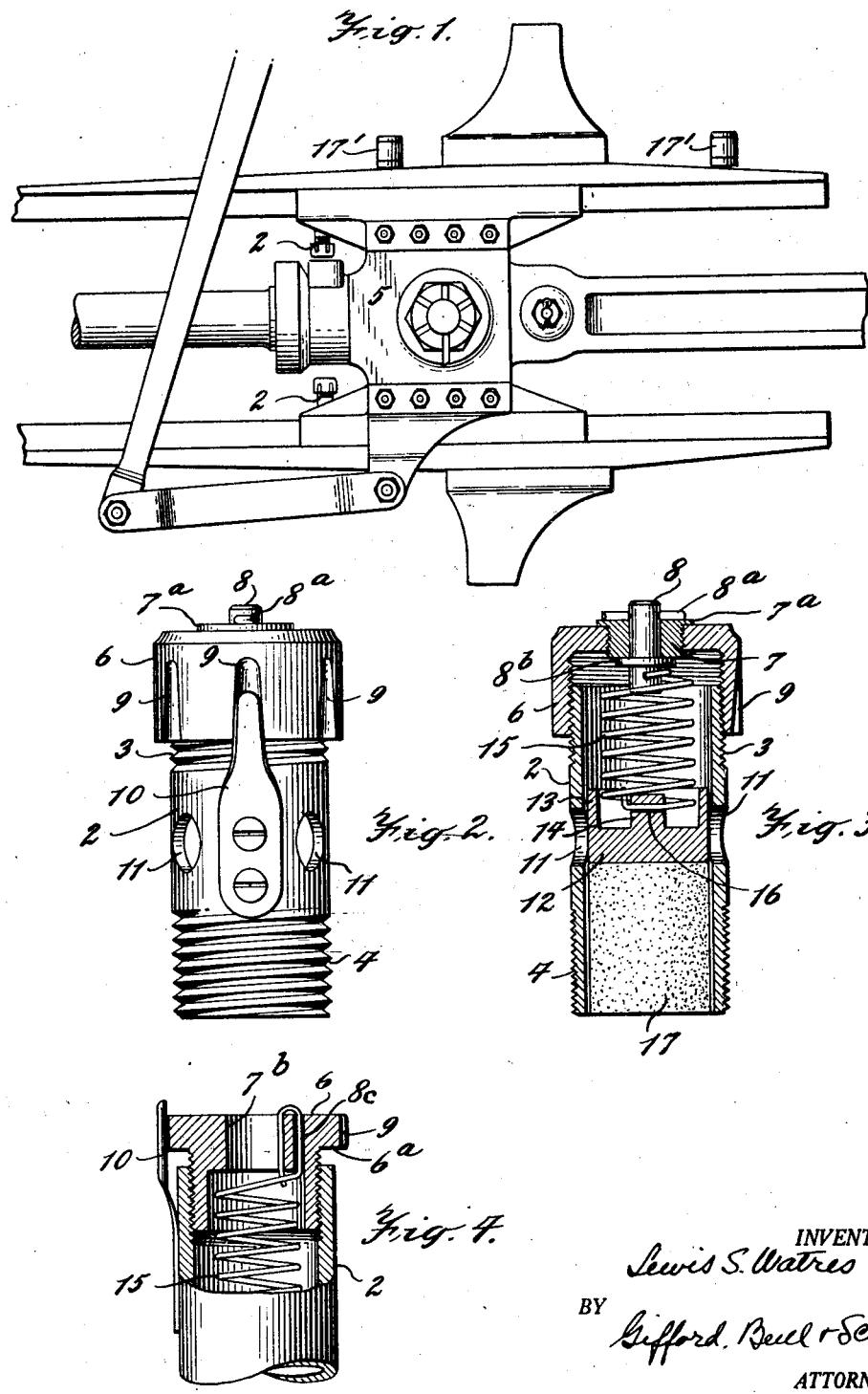

Patented Dec. 4, 1928.

1,694,153

UNITED STATES PATENT OFFICE.

LEWIS S. WATRES, OF SCRANTON, PENNSYLVANIA, ASSIGNOR TO NATIONAL GRAPHITE LUBRICATION COMPANY, OF WILMINGTON, DELAWARE, A CORPORATION OF DELAWARE.

METHOD OF LUBRICATION AND APPARATUS THEREFOR.

Application filed November 15, 1923. Serial No. 674,813.

In my U. S. Patent No. 1,017,935, applied for August 30, 1911, issued February 20, 1912, I have described the application of graphite in the form of a stick to the lubrication of various interior surfaces of an engine, such as those of the cylinder and piston, the controlling valve and its seat. By a grinding wheel the material of the stick was reduced to a finely divided state within the steam chest and the divided graphite thus formed was taken up by the steam and by it carried to the various interior surfaces of the engine.

In the use of the above system an improved graphite stick was invented and is described in the Kirkegaard U. S. Patent No. 1,185,-682, applied for February 12, 1913, issued June 6, 1916, consisting of finely divided (pulverized or flocculent) graphite, and a binder, such as what is commonly known as liquid shellac subjected to high pressure, drying and baking at such a temperature as to carbonize the binder more or less.

Ever since the infancy of the locomotive art the need has been felt of improvement in the methods of lubricating the bearings between the cross-heads or their shoes and the guide bars. So far as I know, graphite or any other form of solid lubricant has never been successfully applied for this purpose and until I conceived the present invention it never occurred to me that a remedy for this want could in any way be supplied by the stick, the finely divided grindings from which I had successfully applied to lubricating the interior surfaces of engines, as described in my said patent of February 20, 1912, by the aid of steam as a distributor.

I have now discovered that oil, such as is ordinarily employed for the lubrication of cross-head bearings, can in conjunction with the friction in such bearings be depended upon to remove the particles of finely divided graphite from the stick, and that the oil may be depended upon as a conveyor to spread such particles throughout the width of the bearing and thus afford a method of greatly improving the lubrication of locomotive cross-head bearings. I have successfully applied this discovery to the lubrication of such bearings and believe that it may be applied successfully to the lubrication of analogous bearings.

In utilizing this discovery, I prefer to employ a stick made as described in said Patent 1,185,682, about one inch in diameter and one inch long, of which the graphite particles range in size passing through a 100 to the inch mesh but not passing through a 300 to the inch mesh. Larger particles are objectionable because they are not as well handled by the oil, and smaller particles are objectionable because of the greater proportion of binder necessary for the formation of the stick from them.

I have already stated that the oil employed is that ordinarily used for the lubrication of cross-head bearings. This is commercially known as engine oil and is of a specific gravity of about 24–26 Beaumé and a viscosity of about 275–350.

In the accompanying drawings I have illustrated apparatus which I have used successfully in carrying out my invention.

Figure 1 is a side elevation of a locomotive cross-head, to the upper and lower arms of which my lubricator is applied. Fig. 2 is a front elevation of my device, and Fig. 3 is a vertical cross section thereof. Fig. 4 is a fragmentary sectional elevation showing a modified form of my device. Fig. 1, is to one scale, and Figs. 2, 3 and 4 are to another and much larger scale.

My improved lubricator comprises body 2, preferably of hollow cylindrical form and which may be threaded externally at each end, 3 and 4, respectively. The lower threaded portion 4 is adapted for screwing into the carrying element, as cross-head 5, Fig. 1. The upper threaded portion 3 is adapted to engage the internally threaded portion of cup-like cap 6. For purposes which will presently be apparent said cap may be provided with a central, threaded, insert portion or stud 7 having a flange 7$^a$. Passing centrally of the stud 7 is a pintle 8 freely rotatable therein and having a flange 8$^b$. Pintle 8 may be secured by means of a cotter pin 8$^a$. The outer periphery of said cap is provided with a plurality of notches or seats, 9, adapted for engaging the free end of upstanding spring 10, the lowest end of which is fixed to body 2. The coaction of said spring and one of notches 9 is efficient for yieldably holding cap 6 in adjusted relation to body 2. Said body is further preferably provided with one or more openings 11 through the side wall thereof for permitting inspection of the contents of the device whereby the progress of the consumption of the graphite stick may be noted without necessitating the removal of the cap 6.

Adapted for sliding freely lengthwise within said body 2 is follower 12. Said follower is preferably cylindrical and is provided with upstanding flange 13 and central ear 14 within said flange. Between follower 12 and cap 6 and preferably attached to both, is push spring 15 adapted for urging follower 12 downwardly, Fig. 3. Ear 14 of follower 12 has hole 16 therethrough for the reception and holding of the lower end of spring 15, and the upper end of said spring is hooked through small hole in the lower end of pintle 8. By this arrangement follower 12 is conveniently and permanently attached to cap 6 and cannot be lost when said cap is removed from body 2. Furthermore, there is no likelihood of twisting the spring when the cap is turned as would be the case should the follower jamb. In addition, this arrangement permits of a centrally directed pressure on the follower.

17', 17' are oil cups such as are ordinarily used for the cross-head bearings of a locomotive, located substantially as shown in Fig. 1. The oil supplied from these cups flows into the upper cross-head bearing and cooperates with the upper graphite stick. Ordinarily, sufficient of this oil will drip from the upper cross-head bearing onto the lower cross-head bearing to cooperate with the lower stick. Should the lower stick, however, require a larger supply of oil, it may ordinarily be afforded from the oil pocket which is usually contained in the lower shoe of the cross-head bearing.

The operation of the device will be easily understood from the foregoing detail description. Suffice it to state that when the device is in place for service, the cake of lubricant 17 is inserted in body 2, cap 6 being removed, and then follower 12 is inserted in said body and cap 6 screwed onto said body, spring 10 engaging one of notches 9.

In Fig. 4 body 2 is threaded internally at its upper end and cap 6 is complementarily threaded externally for engagement therewith. In this arrangement, cap 6 is preferably provided with flange 6ª in which are formed notches on seats 9 for spring 10. In this modification I have also shown an alternative though less advantageous means of securing the spring 15 to the cap 6. As shown, the upper end of spring 15 is hooked through small hole 8ᶜ and then bent over into large hole 7ᵇ thereof.

The spring 15 should exert a very light pressure; in fact, only just about sufficient to insure contact between the stick and the guide bar. Indeed, the spring may be entirely dispensed with and gravity alone relied upon for the bottom stick.

In addition to the advantages above set forth, my invention has another very important advantage, namely, in the saving of oil. A large quantity of the oil supplied to locomotive cross-heads is lost by dripping from or being thrown off of the bearings as the locomotive is running. As the oil employed in the practice of my invention is loaded by the graphite particles which it conveys to various parts of the bearings, the consistency of the combination is so much thicker than that of the oil itself as to greatly reduce the loss of the oil from the above causes.

Without the presence of the oil the stick resists the removal of its particles by friction so that mere friction produces substantially no effect. On the other hand, the mere immersion of the stick in the oil produces substantially no effect. I have discovered, however, that the combined action of the oil with such friction as exists from the movements of a locomotive cross-head is productive of the removal of sufficient particles of graphite from the stick to greatly improve the lubrication afforded by the oil alone. Upon the examination of a bearing, to which my invention was applied, I have discovered that the oil when supplied in the quantities ordinary for lubricating a cross-head bearing will convey the graphite particles so as to distribute them evenly across a bearing of say 7 inches in width and 40 inches long from a stick of only one inch in diameter.

I have described above the importance of my invention in the form in which I have applied it successfully up to the present time, but I do not wish to be understood as in anywise limited to the details.

I claim:

1. The process of lubricating a reciprocatory bearing which consists in pressing against one of the opposing surfaces thereof, finely divided particles of graphite bound together into a solid mass by a binder, and supplying oil at a point separated from a point of application of the graphite whereby the particles of graphite are carried across the bearing after being released by the combined action of the oil and friction; the graphite particles ranging in size passable through a 100 to the inch mesh but not passable through a 300 to the inch mesh, and the oil being of a consistency of approximately 24–26 Beaumé and a viscosity of approximately 275–350.

2. In combination a bearing, means for supplying oil thereto and a graphite stick held against one surface of the bearing in position to be reached by said oil supply.

3. In combination with a moving surface and a bearing therefor, means for supplying oil to said bearing and means for supplying finely divided graphite thereto comprising a graphite stick positioned so as to be contacted by said moving surface.

4. In combination, a cross head for a steam engine and the guide bars forming bearings with said cross head, means for supplying oil to said bearing, a graphite stick, and means for slidably holding said stick against one surface of the bearing.

5. In combination, a cross head for a steam engine and the guide bars forming bearings with said cross head, means carried by said guide bars for supplying oil to said bearings, and a graphite stick carried by a cross head, and means for pressing said graphite stick into slidable engagement with the guide bars, whereby the oil is carried by the moving parts into contact with the graphite stick.

LEWIS S. WATRES.